US007027602B2

(12) United States Patent
Goodman et al.

(10) Patent No.: US 7,027,602 B2
(45) Date of Patent: *Apr. 11, 2006

(54) PERSONAL AUDIO RECORDER IN A VEHICULAR ENTERTAINMENT SOUND SYSTEM USING RECOMMENDED AUDIO SIGNALS

(75) Inventors: Bryan Roger Goodman, Dearborn, MI (US); Kenneth James Varnum, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 679 days.

This patent is subject to a terminal disclaimer.

(21) Appl. No.: 10/063,156

(22) Filed: Mar. 26, 2002

(65) Prior Publication Data

US 2003/0185406 A1 Oct. 2, 2003

(51) Int. Cl.
*H04B 1/00* (2006.01)
(52) U.S. Cl. .................... 381/86; 700/94; 709/219
(58) Field of Classification Search ............... 381/86; 709/219, 203, 229; 369/30.1, 7; 700/94
See application file for complete search history.

(56) References Cited

U.S. PATENT DOCUMENTS

| 4,713,801 A | 12/1987 | Hale |
| 5,345,430 A | 9/1994 | Moe |
| 5,448,534 A | 9/1995 | Okada |
| 5,633,837 A | 5/1997 | Gantt |
| 6,233,389 B1 | 5/2001 | Barton |
| 6,407,750 B1 * | 6/2002 | Gioscia et al. ............... 715/716 |
| 6,662,231 B1 * | 12/2003 | Drosset et al. ............... 709/229 |
| 6,665,234 B1 * | 12/2003 | Goodman et al. ............. 369/7 |
| 2002/0041692 A1 * | 4/2002 | Seto et al. ..................... 381/86 |
| 2003/0028613 A1 | 2/2003 | Mori | |

FOREIGN PATENT DOCUMENTS

| GB | 2 257 558 A | 1/1998 |
| GB | 2 343 053 A | 10/1998 |
| WO | WO 9935009 | 7/1999 |
| WO | WO 03/001797 A1 | 1/2003 |

* cited by examiner

*Primary Examiner*—Brian T. Pendleton
(74) *Attorney, Agent, or Firm*—Gary Smith

(57) ABSTRACT

A method of recording a recommended plurality of audio signals (40) in an entertainment sound system (42) associated with an automotive vehicle (12) includes a central server (14) for processing a plurality of data (16) associated with a plurality of audio signals (18). A data input (22) within the vehicle (12) receives the plurality of data (16). An audio input (20) within the vehicle (12) receives the plurality of audio signals (18). The plurality of data (16) is transmitted from the central server (14) through said data input (22) to a controller (24) within the automotive vehicle (12). Furthermore, the plurality of data (16) is transmitted through the data input (22) to the controller (24). A preferred plurality of audio signals (34) received from the audio input (20) is acoustically played on the entertainment sound system (42). Then, a preferred plurality of data (36) associated with the preferred plurality of audio signals (34) is recorded onto a user profile stored on an electronic medium (30). Finally, a recommended plurality of audio signals (40) having a preference vector congruent to the user profile is recorded onto the electronic medium (30).

15 Claims, 3 Drawing Sheets

PERSONAL AUDIO RECORDER IN A VEHICULAR ENTERTAINMENT SOUND SYSTEM USING RECOMMENDED AUDIO SIGNALS

CROSS REFERENCE TO RELATED APPLICATIONS

The present application is related to U.S. application Ser. No. 10/063,157 entitled "Personal Audio Recorder In A Vehicular Entertainment Sound System", that is simultaneously filed herewith and the disclosure of which is incorporated by reference herein.

BACKGROUND OF INVENTION

1. Technical Field

The present invention relates generally to a vehicular entertainment sound system (VESS), and more specifically, to a method for selectively recording and playing back a plurality of audio sources in a VESS.

2. Background Art

The automotive vehicle has become a venue where many individuals listen to news, traffic, and entertainment programs. By its very nature, the ability to listen to a desired program in a vehicle is significantly limited. For example, the length of time an individual spends in a vehicle rarely coincides with the duration of the program listened to by that person. Further, many times the desired program may not even be broadcasted during the time period an individual is in the vehicle. As a result, the individual is frequently prevented from listening to a desired program in its entirety.

There are many situations in which an occupant cannot listen to an entire audio program. A driver may be required to lower the volume of the VESS for short periods of time to allow him to focus on his driving. Typical situations demanding such action include occasions when unfavorable road conditions exist or when the driver must concentrate on the directions in which he should be driving. Other circumstances requiring the volume to be significantly lowered are when an occupant of the vehicle wishes to engage in a conversation with another person. For whatever reason the volume must be lowered, the individual is prevented from listening to a complete audio program in the vehicle. Such an adverse result is undesirable.

Currently, there exists a radio tape recorder for use in association with a VESS. This device allows a user to record radio broadcasts received by the VESS onto an audiocassette tape. Unfortunately, the recorder fails to provide the listener with a time-delayed version of the program being recorded while such program is being concurrently broadcasted. Accordingly, an individual who misses a portion of a program presently being recorded cannot listen to such portion and the remainder of the broadcast until the entire program has been recorded onto the audiocassette tape. Further, in comparison to RAM or hard disk drive as a medium, audiocassette tapes provide inferior sound quality and are subject to a shorter life span. The radio tape recorder also fails to independently provide users with audio programs that may appeal to the user. This device only records audio programs at the very moment the user activates it.

An automobile radio recording system has been introduced that permits a user to continuously record the contents of a radio program onto electronic media and then transfer such contents onto an audiocassette tape or compact disk. Unfortunately, similar to the previous device the automobile recorder fails to provide the listener with a time-delayed version of the program being recorded as long as such program is being simultaneously broadcasted. It also fails to independently provide the user with desired audio programs without the user's immediate activation of the device.

A programmable radio has been introduced that allows for the selective recording of desired broadcasts. The device has voice recognition software that initiates recording of the broadcast when certain words or phrases are identified by the software. However, similar to the previous devices, the programmable radio is not an ondemand system that allows the user to delay a broadcast for an arbitrary period of time.

A recovery recorder system for audio and video programs continuously records a brief span of a broadcast onto a short-term memory medium. If in viewing or listening to the program the user decides that he would like a copy of the program, a control logic command is executed that causes the material on the short-term storage medium to be transferred to a long-term storage medium. Consequently, a user has a copy of the entire broadcast even though he actuates the system after a portion of the program has already been broadcasted. Unfortunately, this system fails to allow the user to effectively pause the live radio broadcast and then immediately resume playing such broadcast from the same point as long as the program is being simultaneously broadcasted. This device also fails to independently record audio programs appealing to the user without the user's specific identification of such programs.

Digital recorders for television allow users to pause a television program being broadcasted and to subsequently resume playing the program from the same point. Unfortunately, this device does not provide any benefit to occupants of automobiles who wish to time-delay a broadcasted radio program. Also, the digital recorder has no feature to record an audio-only program.

In the context of the Internet and personal computers, technology exists for time-delay of radio broadcasts. However, this technology does not apply to FM, AM, or satellite broadcasts. Therefore, this technology falls short of helping an individual who wishes to listen to particular programs on his VESS.

There is a need to provide vehicular occupants with audio programs suited to their taste and at times when they demand such programs. Therefore, there is a need for a method of selectively recording a plurality of audio sources for a VESS.

SUMMARY OF INVENTION

The present invention provides a system that effectively pauses a live radio broadcast for a selected time period in a VESS. The invention also allows selective recording of audio signals congruent to previous audio signals listened to by the user. Further, the invention allows selective recording of audio signals identified by the user.

In carrying out the present invention, a method and system are provided for recording a plurality of audio signals in a VESS. The method and system provide the user with a selective plurality of desired audio signals upon his demand.

There is disclosed herein a method of recording a plurality of audio signals associated with a VESS. The method includes an audio input associated with an automotive vehicle. The plurality of audio signals is transmitted through the audio input to a controller within the automotive vehicle. A preferred plurality of audio signals is acoustically played on the VESS. A recorder is then actuated to record the preferred plurality of audio signals onto an electronic medium within the vehicle. The preferred plurality of audio signals is recorded for a recording time period onto the electronic medium within the vehicle. The controller suspends acoustical play of the preferred plurality of audio signals received from the audio input. This suspension begins at a halting point, at which time the recorder also begins to record the audio signals. Finally, the acoustical play is resumed from the halting point concurrently as the plurality of audio signals is being recorded. The acoustical play is resumed from the electronic medium within the vehicle.

In a further aspect of this invention, a control system associated with an automotive vehicle includes a controller that receives audio signals and data corresponding to the audio programs so as to compile a user profile. The controller then employs the user profile as a point of comparison for subsequently received audio programs and their accompanying data. If the data of the subsequently received audio program is congruent with the user profile, the controller actuates a recorder to record the audio program for the user.

In yet another aspect of the present invention, the control system associated with the automotive vehicle includes a controller that actuates a recorder to record an audio program upon detecting a programmable recording signal. In operation, the user enables the recording by selecting a programmable recording signal associated with the audio program he wishes to record.

One advantage of the invention is that a user may pause the acoustical transmission of a live radio broadcast in a VESS at an arbitrary point for an arbitrary period of time and then subsequently resume the broadcast from the same point. Another advantage of the invention is that a user may have access to a wide selection of audio programs suited to his personal taste and needs.

Other advantages of the present invention will become apparent upon reading the following detailed description and appended claims, and upon reference to the accompanying drawings.

BRIEF DESCRIPTION OF DRAWINGS

For a more complete understanding of this invention, reference should now be had to the embodiments illustrated in greater detail in the accompanying drawings and described below by way of examples of the invention. In the drawings.

DETAILED DESCRIPTION

Figure 1:
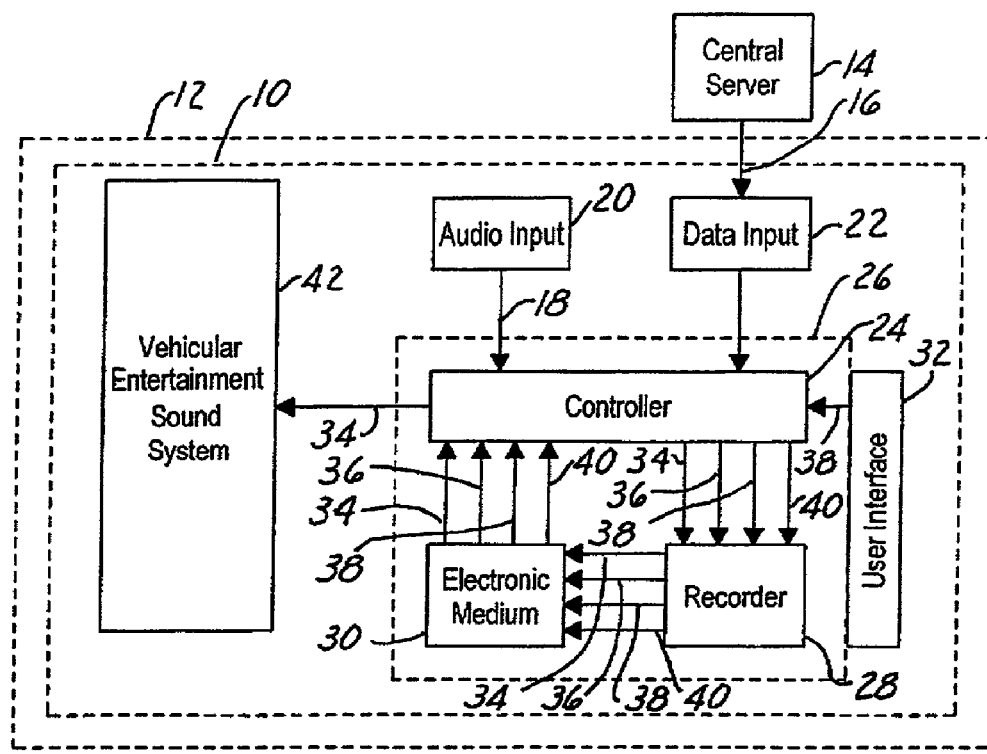
FIG. 1 is a schematic diagram of a personal audio recording system associated with an automotive vehicle according to a preferred embodiment of the present invention.

Referring now to FIG. 1, a personal audio recording system 10 associated with an automotive vehicle 12 is illustrated. In a preferred embodiment of the present invention, the personal audio recording system 10 includes a central server 14 for processing a plurality of data 16 related to a plurality of audio signals 18.

In the preferred embodiment of the invention, the personal audio recording system 10 further includes an audio input 20 and a data input 22 each associated with the automotive vehicle 12.

The audio input 20 transmits the plurality of audio signals 18 to a controller 24 disposed within the automotive vehicle 12. As is widely known in the art, the plurality of audio signals 18 may be acoustically played on a conventional radio for a user to hear. A typical audio input 20 may include at least one of a radio antenna, a radio tuner, a compact disk player, a digital video disk player, a satellite radio receiver, a cellular phone, a telematics unit, and a microphone. Obviously, the specific type of audio input 20 used may vary as the invention requires.

The data input 22 typically receives the plurality of data 16 from the central server 14 and then transmits the plurality of data 16 to the controller 24. The plurality of data 16 preferably includes at least one of a program schedule, a program description, a recommendation, and a preference vector related to the plurality of audio signals 18. Typical data inputs 22 may be at least one of a cellular phone, a packet-based network, a data radio antenna and tuner, a short range connection, a virtual floating network, and a removable medium. Of course, the specific type of data input 20 may vary as well, should circumstances require it.

A personal audio recorder 28 within an automotive vehicle 12 preferably includes the controller 24, a recorder 28, an electronic medium 30, and a user interface 32. The controller 24 receives the plurality of audio signals 18 from the audio input 20 and the plurality of data 16 from the data input 22.

Upon actuation by a user, the controller 24 encodes a preferred plurality of audio signals 34 and commands the recorder 28 to record the preferred plurality of audio signals 34 and its corresponding preferred plurality of data 36 onto the electronic medium 30. Preferable forms of the electronic medium 30 include a flash memory chip, a dynamic RAM, and a hard disk drive. Upon further actuation by the user, the controller 24 may then decode the preferred plurality of audio signals 34 and retrieve them from the electronic medium 30. The personal audio recorder 28 may also employ the user interface 32 for receiving manual feedback 38 from an occupant of the vehicle. Such manual feedback 38 is discussed in greater detail in the description for FIG. 3.

The controller 24 selectively transmits the preferred plurality of audio signals 34 and a recommended plurality of audio signals 40 to the VESS 42. The VESS 42 includes various conventional automobile stereo components. These components may include, but are not limited to, recorders, compact disk players, audiocassette players, MP3 players, speakers, radio tuners, volume controls, and tone controls. Further, the VESS 42 serves as an audio output for providing the desired audio program to the listener in the format he so desires. Most typically, the VESS 42 uses speakers to acoustically play the preferred plurality of audio signals 34 for the user's listening pleasure. In other situations, the VESS 42 may record the preferred plurality of audio signals 34 onto removable media by way of a VESS component. These are only a few examples of the different means a user may benefit from the audio output.

Figure 2B:
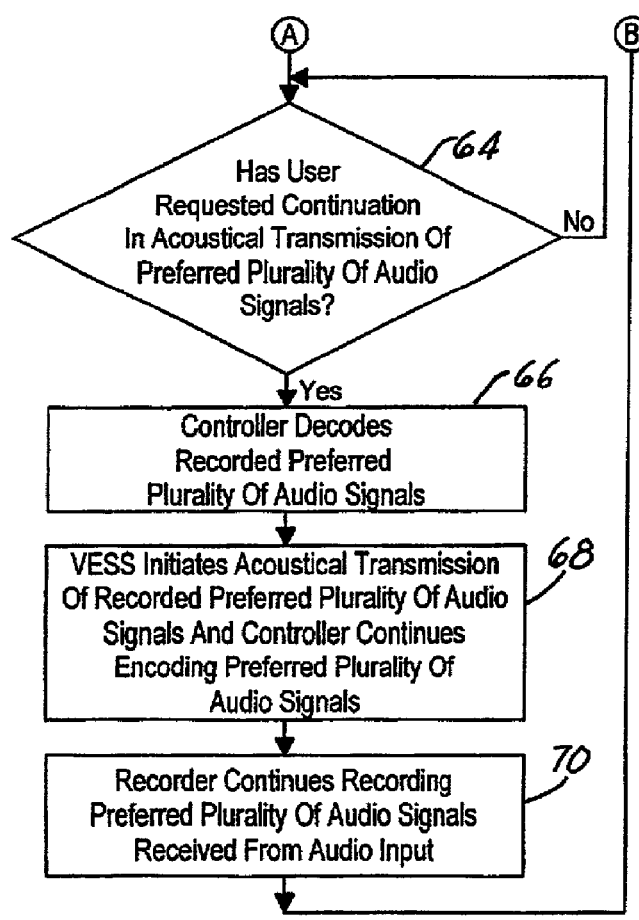
FIGS. 2A and 2B illustrate a flow chart depicting a method of time-delaying an acoustical transmission of a preferred plurality of audio signals in an automotive vehicle according to one embodiment of the present invention.
Figure 2A:
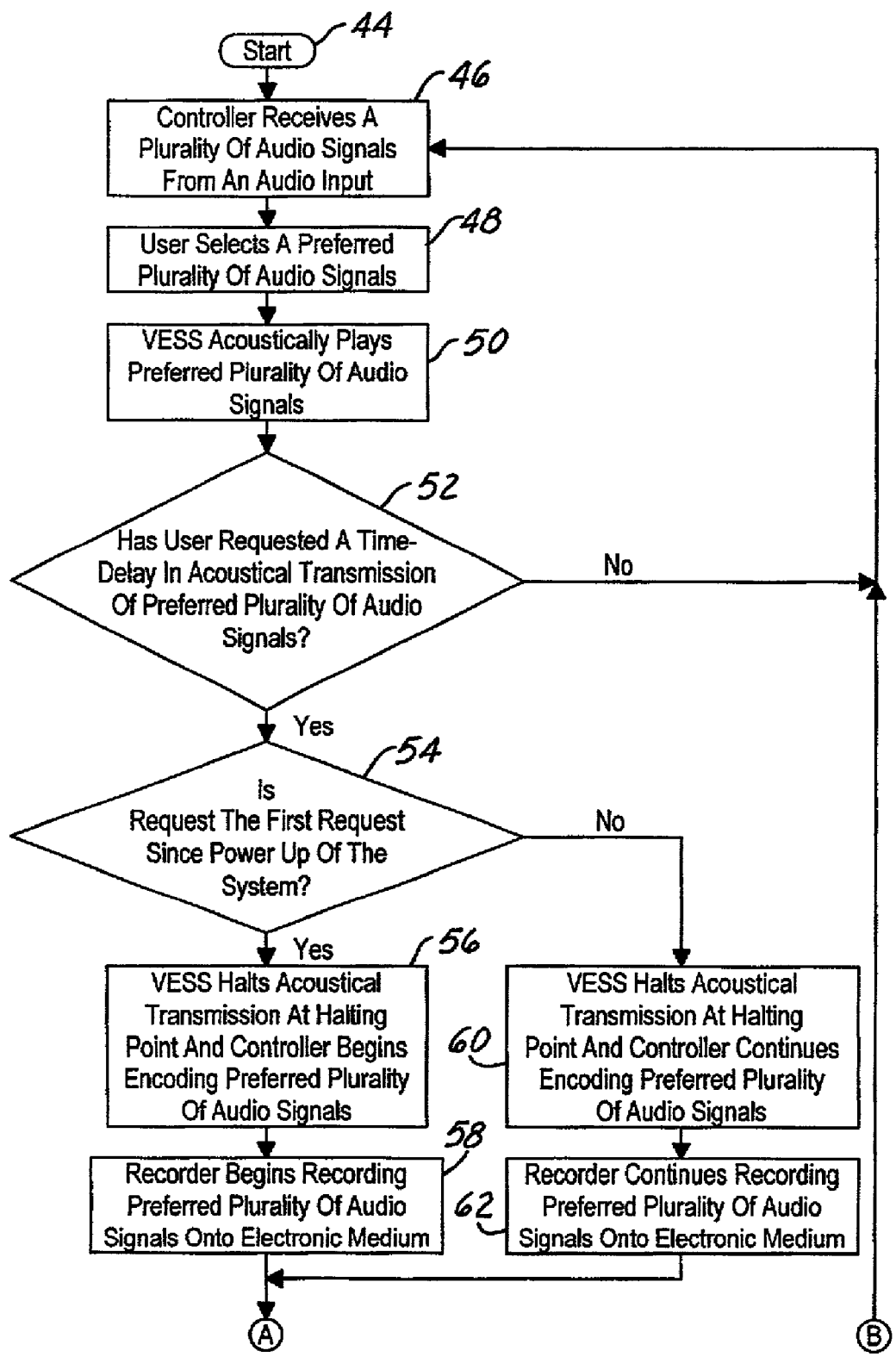

Referring now to FIGS. 2A and 2B, a flow chart illustrates a method of time-delaying an acoustical transmission of a preferred plurality of audio signals 34 in an automotive vehicle 12 according to one embodiment of the present invention. In operation, the method of the present invention is initiated at step 44 and then immediately proceeds to step 46. In step 46, the controller 24 receives a plurality of audio signals 18 from an audio input 20. For example, the controller 24 may receive radio broadcast signals from a radio antenna and a radio tuner associated with the vehicle 12. Obviously, other forms of audio input 20 may be used, as the invention requires. Having performed step 46, the sequence proceeds to step 48.

In step 48, the user selects a preferred plurality of audio signals 34 of the plurality of audio signals 18 received from the audio input 20. For example, the user may select a specific radio program to be acoustically played on the VESS 42. The user may do so by simply choosing a frequency on a radio tuner. The preferred plurality of audio signals 34 is then transmitted from the controller 24 to the VESS 42 for the next operation in step 50.

In step 50, the VESS 42 acoustically plays the preferred plurality of audio signals 34. A component of the VESS 42, such as speakers, receives these signals 18 from the controller 24. Then, the sequence proceeds to step 52.

In step 52, the controller 24 determines whether the user has requested a time-delay in the acoustical transmission of the preferred plurality of audio signals 34 within the automotive vehicle 12. As one skilled in the art would understand, there are various ways of actuating such a request. For example, the user may simply press a button thereby closing an electric circuit with the controller 24 and consequently prompting the controller 24 for the time-delay. Alternatively, the user may speak a command word received by a controller 24 having voice recognition capability. Actuating the request can be accomplished in many different ways.

If in step 52 the controller 24 determines that no request has been made, then the sequence returns to step 46. However, if the controller 24 determines otherwise, then the sequence proceeds to step 54.

In step 54, the controller 24 determines whether the request for the time-delay is the first of such request since power up of the system. If the controller determines that the user has requested a time-delay for the first time since power up of the system, then the sequence proceeds to step 56.

In step 56, the controller 24 actuates the VESS 42 to stop acoustically playing the preferred plurality of audio signals 34 at a halting point. For example, the controller 24 may accomplish this step by ending transmission of the signals 34 to the VESS 42. Further, as the VESS 42 ceases to acoustically play the preferred plurality of signals 34, the controller 24 simultaneously begins to encode the signals 34 as they are received from the audio input 20 according to the preferred embodiment of the present invention. The controller 24 typically encodes the signals 34 from an analog format to a digital format. Preferably, the digital format is an MP3 format. However, the digital format may vary, as the invention requires. Then, the sequence proceeds to step 58.

In step 58, the controller 24 typically actuates the recorder 28 to begin recording the preferred plurality of audio signals 34. The recorder 28 stores the preferred plurality of audio signals 34 onto an electronic medium 30. Then, the sequence proceeds to step 64.

However, if in step 54 the controller determines that the request for a time-delay is not the first of such request since power up of the system, then the sequence proceeds to step 60. In step 58, the controller 24 actuates the VESS 42 to stop acoustically playing the preferred plurality of audio signals 34 at a halting point. Meanwhile, as the VESS 42 stops acoustically playing the signals 34, the controller 24 simultaneously continues to encode the signals 30 according to a preferred embodiment of the present invention. As in step 56, the controller 24 typically encodes the signals 18 from an analog format to a digital format. Preferably, the digital format is an MP3 format. Then, the sequence proceeds to step 62.

In step 62, the controller 24 continues to actuate the recorder 28 to record the preferred plurality of audio signals 34. As in step 58, the recorder 28 stores the preferred plurality of audio signals 34 onto an electronic medium 30. Then, the sequence proceeds to step 64.

In step 64, the controller 24 determines whether the user has requested a continuation in the acoustical transmission of the preferred plurality of audio signals 34. A person of ordinary skill in the art would understand that there are various ways of actuating such a request, as demonstrated in step 52. The user may selectively request the continuation after an arbitrary period of time has passed since halting the acoustical transmission.

If the controller 24 determines that the user has not requested a continuation of the acoustical transmission within the automotive vehicle 12, then the sequence repeats step 64. However, if the controller 24 determines that the user has requested the continuation, then the sequence proceeds to step 66.

In step 66, the controller 24 preferably decodes the preferred plurality of audio signals 34 starting at the halting point. The controller typically decodes the signals 34 from a digital format to an analog format. The preferred plurality of audio signals 34 is then transmitted from the controller 24 to the VESS 42 for the next operation in step 68.

In step 68, the VESS 42 acoustically plays the preferred plurality of audio signals 34. As mentioned in step 48, a component of the VESS 42, typically the speakers, receives the signals 34 and acoustically plays the signals 34 for the user to hear. Further, as the VESS 42 resumes acoustically playing the signals 34, the controller 24 simultaneously continues to encode the signals 34 according to the preferred embodiment of the present invention. As in step 54, the controller 24 typically encodes the signals 34 from an analog format to a digital format. Preferably, the digital format is an MP3 format. Then, the sequence proceeds to step 70.

In step 70, the controller 24 continues to actuate the recorder 28 to record the preferred plurality of audio signals 34. As in step 58, the recorder 28 stores the preferred plurality of audio signals 34 onto an electronic medium 30. Then, the sequence returns to step 46.

Thus, a method of time-delaying an acoustical transmission of a preferred plurality of audio signals 34 in an automotive vehicle 12 is provided. Accordingly, a user may selectively pause and resume the acoustical transmission of a preferred plurality of audio signals 34 as the signals 34 are simultaneously being received by the controller 24.

Figure 3:
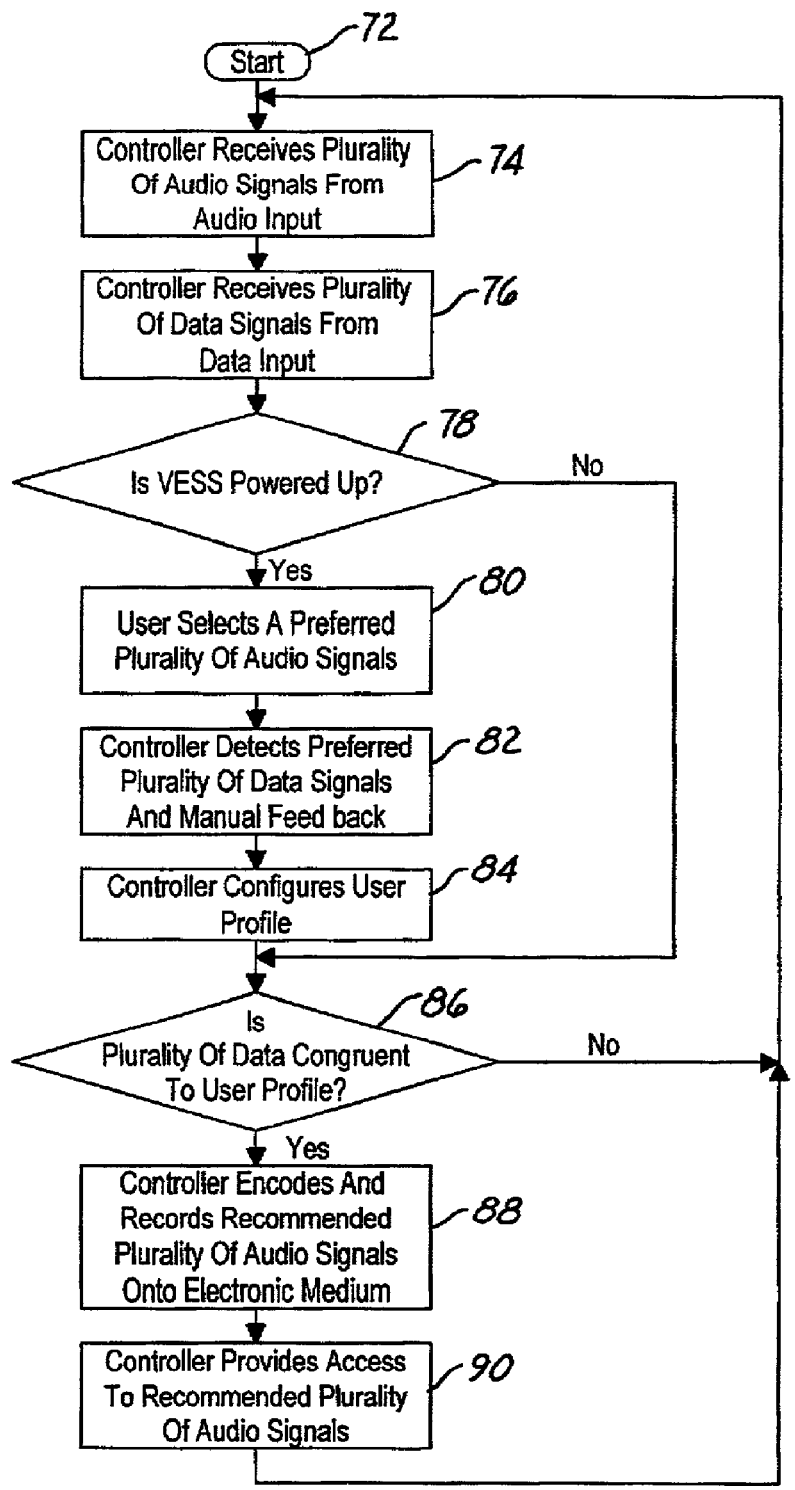
FIG. 3 is a flow chart depicting a method of providing a recommended plurality of audio signals within an automotive vehicle according to one embodiment of the present invention.

Referring now to FIG. 3, a flow chart depicts a method of providing a recommended plurality of audio signals within an automotive vehicle according to one embodiment of the present invention. In operation, the method of the present invention is initiated at step 72 and then immediately proceeds to step 74. In step 74, a controller 24 receives a plurality of audio signals 18 from an audio input 20. For example, the controller 24 may receive radio broadcast signals from a radio antenna and a radio tuner associated with the automotive vehicle 12. Then, the sequence continues to step 76.

In step 76, the controller 24 receives a plurality of data 16 from the data input 22. In a preferred embodiment, the data input 22 receives the plurality of data 16 from a central server 14 that processes the plurality of data 16. Typically, the plurality of data 16 comprises at least one of a program description, a program schedule, a recommendation, and a preference vector associated with the plurality of audio signals 18. Elements of the preference vector may include relative weightings of different audio types. Alternatively, the controller 24 can store, on the electronic medium 30, multiple preference vectors for different users. For example, a program description may classify an audio program by at least one of a genre, a style, an artist, a song title, and an album. Examples of genre typically include, but are not limited to, music, traffic news, international news, financial news, controversial talk, and comedy programs. The operation then proceeds to step 78.

In one embodiment of the invention, the plurality of audio signals 18 and the corresponding plurality of data 16 may be received by the controller 24 if the user selects the specific frequency broadcasting the audio signals 18 and data 16. In an alternative embodiment, the audio signals 18 and the data 16 are received from various sources at a single time without actuation by the user.

In step 78, the controller determines whether the VESS 42 has been powered up. If the VESS 42 is not powered up, then the sequence immediately proceeds to step 86. If, however, the VESS 42 is powered up, then the sequence continues to step 80.

In step 80, the user selects a preferred plurality of audio signals 34 of the plurality of audio signals 18 received by the audio input 20. The preferred plurality of audio signals 34 composes an audio program listened to by the user for a predetermined minimum time period. For example, if the VESS 42 is powered up, this step may be accomplished when the user selects a frequency on a radio tuner and listens to a financial news broadcast for a minimum of two minutes. Further, the user may also employ the user interface 32 to input into the controller 24 a manual feedback 38 that describes the type of audio programs he would like to hear. These examples are only a couple of the many different ways the user may choose a desired audio program. The sequence then continues onto step 82.

In step 82, the controller 24 detects the preferred plurality of data 36 and the manual feedback 38, each describing characteristics of an audio program the controller 24 may record. For example, according to step 78 the user may be listening to a financial news broadcast on a particular radio station. Then, pursuant to step 80, the controller 24 detects the data 36 identifying the financial news broadcast. The data 36 may include the time of the broadcast, the frequency of the broadcast, and a description of the genre or style of the broadcast. Of course, various other ways of identifying a desired program may be used. Then, the sequence proceeds to step 84.

In step 84, the controller 24 uses the preferred plurality of data 36 and the manual feedback 38 to format a user profile. For example, the user profile may include the particular genres or styles of audio programs that the user listens to along with the frequency in which he listens to these programs. Further, the user profile may also include the artist names, song titles, and other descriptions of the audio programs he wishes to hear. Then, the sequence proceeds to step 86.

In step 86, it is determined whether the plurality of data 16 is congruent to the user profile, with the user profile being compiled from the audio programs listened to by the user and the manual feedback inputted into the system by the user.

In a preferred embodiment of the present invention, step 86 is accomplished by the controller 24 within the automotive vehicle 12. For example, a controller determines that a preference vector associated with a financial news broadcast is congruent to a user profile if the user has in the past frequently listened to financial news on that VESS 42. Also, the controller 24 may determine the program description associated with a financial news broadcast is congruent to a user profile if the user selected such a program by inputting a proper identification in the manual feedback 38. On the other hand, a plurality of a data 16 associated with a financial broadcast would not be congruent to a user profile if the user has never listened to a financial news broadcast on the VESS 42 or has never selected such a program through the user interface 32. Obviously, these are only a few examples of carrying out this step of the invention.

In an alternative embodiment of the present invention, step 86 is performed by the central server 14. The central server 14 preferably employs a recommender system based on collaborative filtering. As one skilled in the art would understand, a collaborative filtering algorithm is a standard method of generating recommendations. Pursuant to this embodiment, the controller 24 typically uses the data input 22 to transmit the user profile to the central server 14. The central server 14 then searches its database for user profiles of neighbors. Neighbors are other individuals that have preferences in audio programs similar to those of the user. The central server typically searches for mismatches between the neighboring profiles and the user profile. Subsequently, the central server flags data 16 associated with these mismatched audio programs as recommendations for the user and then transmits these recommendations to the controller 24.

The controller 24 receives the recommendation and begins to record upon detecting a recording signal. The recommendation may take the form of at least one of an artist name, song title, program description, and program schedule. The recording signal typically is at least one of a plurality of data 16 and a plurality of audio signals 18 that matches the recommendation. For example, if a neighbor frequently listens to controversial talk broadcasts and the user never has, a recommendation may indicate that the user may also appreciate controversial talk broadcasts. The controller 24 may receive a plurality of data 16 specifying broadcast schedules of various controversial talk broadcasts on several different frequencies. Accordingly, the time of the broadcast is the recording signal. Upon reaching the time of broadcast of the controversial talk program, the controller selects the corresponding frequency and prepares to record for the scheduled period. Another example employs the plurality of audio signals 18 as the recording signal. For instance, the user may have inputted manual feedback 38 into the controller 24 commanding the recorder to record traffic reports. The controller 24 may employ voice recognition software to detect the word "traffic" and begin recording for a predetermined time period upon detecting the word. These examples only illustrate typical methods of carrying out step 86.

If, in step 86, the controller 24 determines that the plurality of data is not congruent to the user profile, then the sequence returns to step 74.

However, if the controller 24 determines that the plurality of data 16 is congruent to the user profile, then the sequence proceeds to step 88. In step 88, the controller 24 encodes a recommended plurality of audio signals 40 associated with the plurality of data 16 congruent to the user profile. The controller 24 usually encodes the recommended plurality of audio signals 18 from an analog format to a digital format. Preferably, the digital format is an MP3 format; however, it may be otherwise as the invention requires. Further, the controller 24 actuates the recorder 28 to record the recommended plurality of audio signals 40 onto the electronic medium 30. Then, the sequence proceeds to step 90.

In step 90, the controller 24 provides the user with access to the recommended plurality of audio signals 40. For example, the controller 24 may employ the user interface 32 to inform the user that a recommended plurality of audio signals 40 is available to him. The user may acoustically play the recommended plurality of audio signals 40 by actuating the controller 24 to do so. Upon actuation, the controller 24 retrieves the recommended plurality of audio signals 40 from the electronic medium 30 and preferably decodes the recommended plurality of audio signals 40 from a digital to an analog format. Then, the controller 24 transmits the recommended plurality of audio signals 40 to the VESS 42 for acoustical transmission.

While particular embodiments of the present invention have been shown and described, numerous variations and alternate embodiments will occur to those skilled in the art. Accordingly, it is intended that the invention be limited only in terms of the appended claims.

The invention claimed is:

1. A method of recording a recommended plurality of audio signals in an entertainment sound system associated with an automotive vehicle, the method comprising the steps of:
   providing a central server for processing a plurality of data associated with a plurality of audio signals;
   providing a data input for receiving said plurality of data; said data input being associated with the automotive vehicle;
   providing an audio input for receiving said plurality of audio signals, said audio input being associated with the automotive vehicle;
   transmitting said plurality of data from said central server through said data input to a controller within the automotive vehicle, said plurality of data being at least one of a program schedule, a program description, a recommendation, and a preference vector;
   transmitting said plurality of data through said data input to said controller;
   acoustically playing a preferred plurality of audio signals on the entertainment sound system, said preferred plurality of audio signals received from said audio input;
   recording a preferred plurality of data associated with said preferred plurality of audio signals, recording said preferred plurality of data onto a user profile stored on an electronic medium; and
   recording the recommended plurality of audio signals onto said electronic medium, the recommended plurality of audio signals having a preference vector congruent to said user profile.

2. The method as recited in claim 1 wherein the step of recording said preferred plurality of audio signals comprises:
   encoding said preferred plurality of audio signals to a digital format, said digital format being at least one of an MP3 format or an MPEG format.

3. The method as recited in claim 1 wherein said user profile is stored on said electronic medium Within the automobile.

4. The method as recited in claim 1 further comprising the step of transmitting said user profile to said central server for generating at least one of said user profile and the recommended plurality of audio signals.

5. The method as recited in claim 1 further comprising:
   transmitting the plurality of audio signals from said audio input to a controller within the automotive vehicle;
   actuating a recorder to record said preferred plurality of audio signals onto an electronic medium within said vehicle;
   recording said preferred plurality of audio signals for a recording time period onto said electronic medium within said vehicle;
   halting an acoustical play of said preferred plurality of audio signals received from said audio input at a halting point; and
   resuming said acoustical play from said halting point concurrently as the plurality of audio signals is being recorded, resuming said acoustical play from said electronic medium within said vehicle.

6. The method as recited in claim 5 wherein said recording time period is selectively determined by a user.

7. The method as recited in claim 5 wherein said recording lime period is a predetermined time period.

8. The method as recited in claim 5 wherein said step of actuating a recorder to record the plurality of audio signals comprises:
   designating a programmable recording signal, said programmable recording signal being at least one of a selectively chosen time, a selectively chosen word, and a selectively chosen phrase.

9. The method as recited in claim 5 wherein said step of actuating a recorder to record the plurality of audio signals comprises:
   detecting a programmable recording signal within the plurality of audio signals, said programmable recording signal being at least one of a selectively chosen time, a selectively chosen word, and a selectively chosen phrase.

10. The method as recited in claim 5 wherein the step of resuming said acoustical play of said preferred plurality of audio signals from said electronic medium comprises:
    decoding said preferred plurality of audio signals.

11. A personal audio recording system associated with an automotive vehicle, the personal audio recording system comprising:
    an audio input associated with the automotive vehicle, said audio input transmitting a plurality of audio signals;
    a data input associated with the automotive vehicle, said data input transmitting a plurality of data, said plurality of data comprising at least one of a program schedule, a program description, a recommendation, and a preference vector;
    a controller receiving said plurality of audio signals and said plurality of data, said controller being within the automotive vehicle,
    an entertainment sound system acoustically playing a preferred plurality of audio signals received from said audio input, said entertainment sound system disposed within the automotive vehicle; and
    a recorder actuated by said controller to record a preferred plurality of data of said preferred plurality of audio signals, said recorder records said preferred plurality of data onto a user profile stored on an electronic medium within the automotive vehicle, said recorder actuated by said controller to record a recommended plurality of audio signals having said preference vector congruent to said user profile.

12. The personal audio recording system as recited in claim 11 wherein said controller actuates a recorder to record said preferred plurality of audio signals for a recording time period upon detecting a programmable recording signal, said programmable recording signal being at least one of a selectively chosen time, a selectively chosen word, and a selectively chosen phrase.

13. The personal audio recording system as recited in claim 11 wherein said controller selectively transmits a preferred plurality of audio signals from said audio input, said controller encodes said preferred plurality of audio signals, said controller selectively actuates a recorder to record said preferred plurality of audio signals onto an electronic medium; said controller decodes said preferred plurality of audio signals, said controller selectively transmits said preferred plurality of audio signals from said electronic medium concurrently as said recorder records said plurality of audio signals.

14. The personal audio recording system as recited in claim 11 wherein said user profile is stored on said electronic medium within the automotive vehicle.

15. The personal audio recording system as recited in claim 11 further comprising the step of transmitting said preferred plurality of data to said central server for generating at least one of said user profile and said recommended plurality of audio signals.

* * * * *